овый
United States Patent [19]

Tada et al.

[11] Patent Number: 6,074,981
[45] Date of Patent: Jun. 13, 2000

[54] PHOTOCATALYST AND PROCESS FOR THE PREPARATION THEREOF

[75] Inventors: Hiroaki Tada; Koji Shimoda; Toshiya Ito; Akihiko Hattori, all of Itami, Japan

[73] Assignees: Nippon Sheet Glass Co., Ltd., Osaka; NSG Techno-Research Co., Ltd., Itami, both of Japan

[21] Appl. No.: 09/051,223

[22] PCT Filed: Aug. 1, 1997

[86] PCT No.: PCT/JP97/02681

§ 371 Date: Apr. 3, 1998

§ 102(e) Date: Apr. 3, 1998

[87] PCT Pub. No.: WO98/05413

PCT Pub. Date: Feb. 12, 1998

[30] Foreign Application Priority Data

| Aug. 5, 1996 | [JP] | Japan | 8-205626 |
| Sep. 18, 1996 | [JP] | Japan | 8-245886 |
| Apr. 2, 1997 | [JP] | Japan | 9-083857 |

[51] Int. Cl.$^7$ .......................... B01J 27/06; B01J 27/135
[52] U.S. Cl. .......................... 502/224; 502/226; 502/227; 502/228; 502/229; 502/230; 502/231
[58] Field of Search ........................... 502/224, 227, 502/226, 228, 229, 230, 231

[56] References Cited

U.S. PATENT DOCUMENTS

| 5,183,656 | 2/1993 | Uesaka et al. | 424/76.1 |
| 5,472,593 | 12/1995 | Gosling et al. | 208/65 |
| 5,690,922 | 11/1997 | Mouri et al. | 424/76.1 |

*Primary Examiner*—Elizabeth D. Wood
*Attorney, Agent, or Firm*—Armstrong, Westerman, Hattori, McLeland & Naughton

[57] ABSTRACT

Fluorine contained within a photocatalyst layer containing titanium oxide and other metallic oxide semiconductors increases the metallic oxide's photocatalytic activity. The described photocatalyst may be in the form of either film, flake, particulate, or fiber. In addition, it can be used for coating the surface of a base material of various forms, such as sheet, film, flake, particulate, bar, or fiber. When using a base material that has an alkaline-containing glass composition, establishing a fluorine-containing layer, such as a layer of fluorine-containing silicon dioxide and other metallic oxide, between the photocatalyst film and the base material can prevent the deterioration of photocatalytic activity of the photocatalyst layer. The fluorine-containing layer functions as an alkaline barrier that controls the diffusion and migration of alkali metallic ions in the glass fibers, such as Na ions, into the photocatalyst layer. Inorganic fiber- and glass sheet-based photocatalyst bearing materials have an excellent capability to decompose rarefied harmful organic gases, and are suitable for use as interior wall and air filters in super clean enclosed spaces and conveyance spaces for semiconductor production, clean rooms for various other purposes, and office and residential buildings, and for other purposes including air cleaning, antibacterial action, anti-fouling action, and defogging of clear sheets (maintaining hydrophilicity).

3 Claims, 1 Drawing Sheet

PHOTOCATALYST AND PROCESS FOR THE PREPARATION THEREOF

TECHNICAL FIELD

The present invention relates to a photocatalyst, and more particularly to a highly reactive photocatalyst or a photocatalyst bearing material, and its manufacturing method, that can be applied to window glass and interior wall materials used in hospitals, offices, and automobiles. The photocatalyst provides various functions, such as indoor air cleaning, antibacterial, anti-fouling, and defogging action. Furthermore, it demonstrates excellent indoor air cleaning performance when used as an interior wall material and in air filters for super clean enclosed spaces and conveyance enclosed spaces for semiconductor production, clean rooms for various other purposes, and office buildings and residential homes.

BACKGROUND OF THE INVENTION

Antibacterial oxide semiconductors, such as titanium oxides, zinc oxides, tungsten oxides, and iron oxides, which have high photocatalytic activity and excellent durability, have been introduced as various fixed-type photoreactors that are immobilized on fixed supporters. For instance, Japanese Laid-Open Patent No. 63-97234/1988 discloses an immobilized photocatalyst comprised of particle-, flake-, or fiber-shaped clear material coated with a platinum- or palladium-doped titanium oxide thin film.

The development of a product bearing a photocatalyst with a higher photoreactivity is greatly desired because it broadens the possibility of using such a product as an antipollution material, besides acting as an antibacterial agent.

Among various photocatalytic materials, titanium oxide, which has the highest photocatalytic activity and excellent durability, already has been actually used as an antibacterial agent in a particulate form. Titanium oxide, however, can be excited only by ultraviolet light, the amount of which is limited under actual usage conditions. Accordingly, it can be said that the window glass application for indoor use is best suited for the product, as both artificial illumination and sunlight can be utilized.

However, as the window glass application also requires high clarity of photocatalyst film, titanium oxide particulate-based material has not be utilized. Thus, achieving a photocatalytic film with both high photocatalytic activity and clarity can maximize its performance and significantly broaden potential applications.

Another serious problem with photocatalytic film in window glass application is its significantly reduced reactivity due to Na ion diffusion from the soda-lime glass base material. As a solution to this problem, the use of a Na diffusion-preventing silica undercoat for glass surfaces has been proposed (Paz, et al., J. Mater. Res., Vol. 10, p2842, 1995). It has been reported that this method can achieve photocatalytic activity similar to that of a titanium oxide film coating on a quartz substrate.

Recently, in the field of semiconductors, reduced yield caused by trace organic gases in clean rooms being deposited on substrates has become a serious problem as the density of elements increases. In addition, even in a residential setting, allergic reactions to various plasticizers that may be in construction materials, such as formaldehyde and acetaldehyde, have become a serious concern.

The aforementioned photocatalysts, such as titanium oxide, effectively oxidize organic materials, and can decompose various organic gases existing indoors. Therefore, the photocatalysts have the potential of becoming a key material to solve the above-mentioned reduced semiconductor yield and allergy problems.

However, for a photocatalyst to decompose organic gases, it is essential to improve its reactivity and expand its surface area because the concentration of gases is extremely small.

In the past, various attempts were made to make shoji-screen paper- or glass fiber cloth-based material bear a photocatalyst to decompose organic gases of extremely low concentration (for instance, Japanese Laid-Open Patent No. 1-139139/1989). Although the surface area is large, shoji-screen paper is an organic material itself that, over time, inevitably deteriorates and possibly becomes a new pollutant. This limits the scope of application. Moreover, a photocatalyst directly borne by a glass fiber cloth cannot achieve a high level of photocatalytic activity. This is because alkaline components diffused from the glass reduce the photocatalyst's crystallization property during the process of stabilizing the photocatalyst on the glass fiber.

Accordingly, it is an object of the present invention to provide a photocatalyst that has a higher photoreactivity efficiency and durability, as compared to conventional photocatalyst, the photocatalyst bearing material, and a manufacturing method of the photocatalyst.

Another object of the present invention is to provide a photocatalyst that solves the aforementioned problems of conventional techniques, a photocatalyst bearing material, and a manufacturing method of the photocatalyst.

Yet another object of the present invention is to maintain a high photocatalytic activity even when a base material comprised of alkaline-containing glass composition is used so as to perform excellently in indoor air cleaning, antibacterial and defogging action in offices, hospitals, automobiles and the like.

Furthermore, an object of the present invention is to provide a photocatalyst and a photocatalyst bearing material that solve the aforementioned problems with conventional techniques, and that not only efficiently decompose harmful organic gases, but also have antibacterial, anti-fouling, and defogging functions, when the photocatalyst and the photocatalyst bearing material are used as air cleaning for super clean enclosed space for semiconductor production, conveyance enclosed spaces, clean rooms for various other purposes, office buildings, and automobiles, and are used as interior wall material, window glass, and in air filters. In addition, an object of the present invention is to provide a manufacturing method for the aforementioned photocatalyst and the photocatalyst bearing material.

DISCLOSURE OF THE INVENTION

Figure 1:
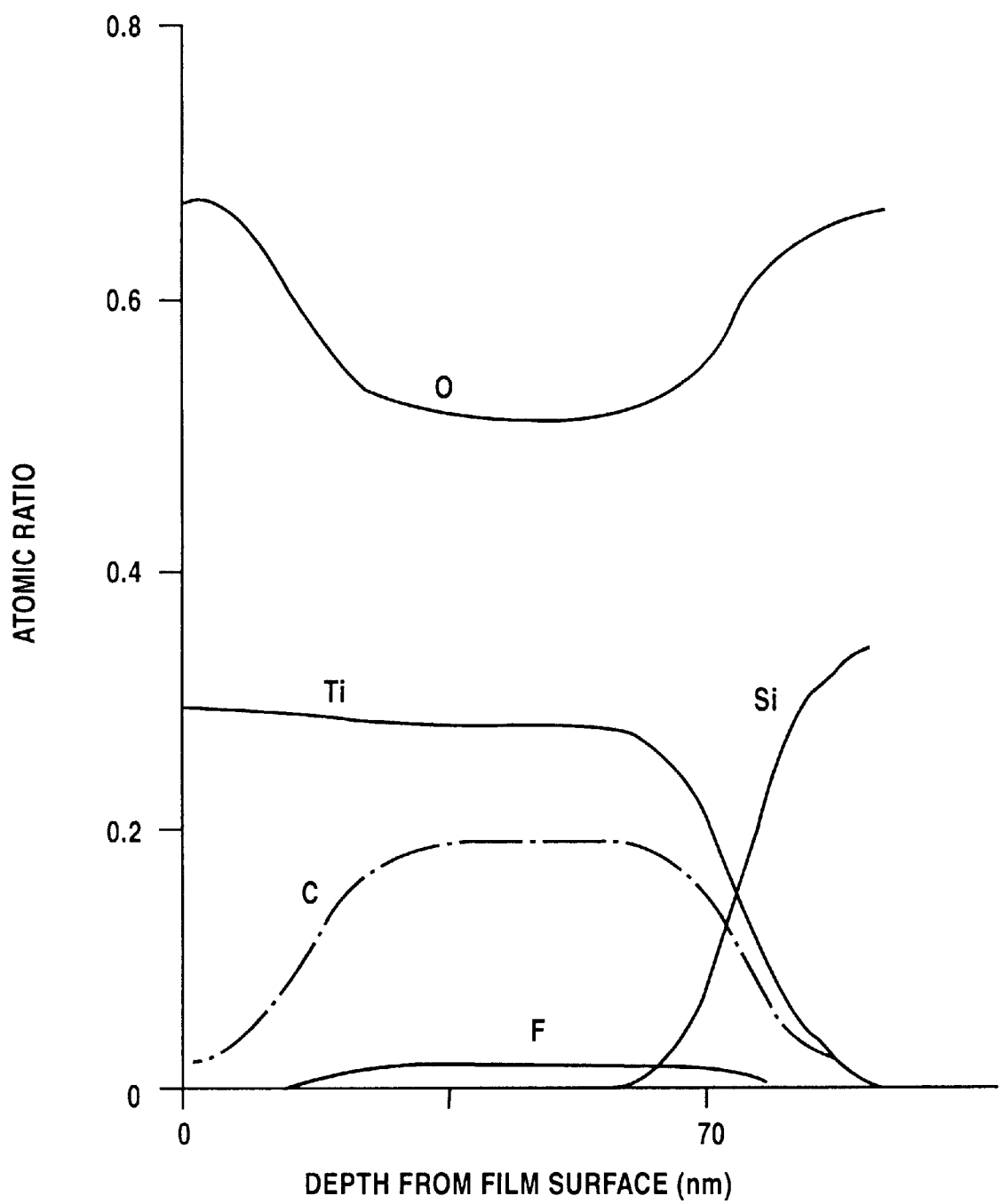
FIG. 1 is a graph showing a depth-wise atomic ratio of a photocatalyst in Preparation Example 4 according to the present invention.

The inventors discovered that a photocatalyst layer comprised of an oxide semiconductor, such as titanium oxide, and containing fluorine enhances the photocatalytic activity of the said oxide.

Materials used for the present invention's photocatalyst are not particularly limited and can be oxides, such as titanium oxide ($TiO_2$), ZnO, ZnS, $WO_3$, $Fe_2O_3$, GaAsP, CdSe, GaAs, CdS, $SrTiO_3$, GaP, $In_2O_3$, $MoO_2$, and $TiO_2$—Pt—$RuO_2$ alloy. Among them, titanium oxide, which has high reactivity and excellent physico-chemical stability, is most broadly used at present. Titanium oxide crystalline thin film can be formed by using, for instance, the vacuum deposition method.

Furthermore, the photocatalytic activity of the present invention heavily depends on its film thickness or minimum size. Fiber photocatalysts are generally discussed in terms of their minimum sizes rather than their thickness, but in the following discussion the term of "thickness" will be understood to cover both. If the thickness is too small, sufficient light is not absorbed. If it is too thick, the photo carrier generated within the film cannot diffuse through the outer surface. Catalytic activity in either case is reduced. Optimal film thickness is also affected by usage conditions. In the case of titanium oxide-based photocatalyst film, a thickness range of 5 nm–2 $\mu$m (more preferably in the range of 20 nm–1 $\mu$m or ideally in the range of 50–200 nm) materializes a good level of photocatalytic activity.

The present invention's photocatalyst itself may also take the form of film, flake, particulate, or fiber. In addition, the present invention's photocatalyst can be produced by vacuum deposition method, chemical vapor deposition (CVD) method, liquid phase deposition method, sol-gel method, particulate baking method, and other manufacturing methods. A photocatalyst thin film can be manufactured easily by using the sol-gel method, in particular, with a complex of titanium alkoxide chemically modified with a chelating agent, such as acetylacetone, and by controlling the baking conditions.

It can also be used as a coating on the surface of various base materials(substrates), which can be in a variety of formats including sheet, film, flake, particulate, powder, bar, and fiber. It is preferable to use the entire surface of the photocatalyst as a reactive surface when it is not used as a coating for such base materials.

In the case of forming a photocatalyst film on a base material's surface, such a material can be inorganic, such as glass, quartz, and ceramics, or metal in various formats, including sheet, film, flake, particulate, powder, bar, and fiber. If a glass sheet material is used as window glass, it is preferable to select a material that allows permeation of light (ultraviolet light and/or visible light), which excites the photocatalyst film, with a 20% or more (preferably 50% or more or ideally 90% or more) light transmittance per 1 cm of the substrate.

If the glass substrate does not allow permeation of light, the light cannot travel through the material to reach the titanium oxide photocatalyst film, thus reducing the utilization of sunlight.

Furthermore, the aforementioned substrate may have a smooth surface. However, if a clear perspective, as in a window glass, is not required, a rough surface is preferred to achieve an improved photocatalytic activity rate. There are no special restrictions for surface roughening methods; chemical etching with HF aqueous solution and physical grinding process with grinding materials and the like can be used. The depth of irregularity is preferably about 200 nm or more to scatter ultraviolet and/or visible light. If the depth of irregularity is too deep, however, the mechanical strength of the base material is reduced, thereby making it vulnerable. Accordingly, maximum depth of 0.1 mm is preferred, and range of 0.5–10 m is particularly suitable. The pitch of irregularity is not particularly limited and it naturally varies, depending on the depth of the irregularity. A pitch of about ten times the depth is usually used.

One of the characteristics of the present invention is the significantly increased photocatalytic activity level possible by having a photocatalyst layer containing fluorine. If the doped fluorine amount is too small, it has a small effect on increasing photocatalytic activity. The preferred amount of fluorine in the photocatalytic layer is in the range of 0.02–1.0 percentage by weight. Methods for incorporating fluorine into the photocatalyst layer include directly adding fluorine compound to the material that forms the photocatalyst layer, and establishing a fluorine-containing layer in advance between the aforementioned base material and the aforementioned photocatalyst layer so as to allow fluorine migration from the fluorine-containing layer to the photocatalyst layer during baking.

For example, adding a fluorine compound, such as trifluoroacetic acid (TFA), to a sol-gel material, titanium alkoxide solution, leaves fluorine residues in the baked film and, thus, increases photocatalytic activity.

Adding the fluorine compound to a more preferable solution containing a complex of titanium alkoxide and a chelating agent significantly increases photocatalytic activity as compared to the solution without the chelating agent. The concentration of titanium alkoxide and acetylacetone, if used, is the same as the concentration conditions stated earlier; the ratio in moles of TFA to Ti of 0.01 or more is sufficient, more preferably the ratio should fall within the range of 0.02–0.1. After baking, the ratio of F to Ti atoms at the surface of the titanium oxide film is close to zero, while it is 0.05–0.1 within the film.

If glass fibers and glass sheet, an alkaline-containing glass composition in particular, are used as base materials for the present invention, and a fluorine-containing silicon dioxide or any other metallic oxide layer is used as a fluorine-containing layer, the layer also functions as an alkaine shielding layer that prevents alkaline metallic ions within the glass fibers, such as Na ion, from difusing and migrating into the photocatalyst layer, thereby preventing reduction in photocatalytic activity.

For the present invention, in addition to TFA, such fluorine compounds as HF, $NH_4F$, and freon also can be used.

Another trait of the present invention is that, in the case of coating a base material with a photocatalyst layer, it establishes a fluorine-containing layer in advance between the base material, comprised of inorganic fiber cloth and glass sheet, and the aforementioned photocatalyst layer. In this case, heating titanium oxide and the other photocatalyst layer, preferably at 450–550° C. temperatures for 10 minutes-two hours, diffuses fluorine from the undercoat layer (the fluorine-containing layer) to the photocatalyst layer, thereby increasing the photocatalytic activity. When using chemical vapor deposition (CVD) and sol-gel methods, heat treatment is necessary for crystalizig initially formed amorphous titanium oxide- and other oxide-based photocatalyst layer film. The crystallizing heat treatment is usually performed at 450–550° C. temperatures for 10 minutes-two hours. If the undercoat, a fluorine-containing layer, is established, the aforementioned fluorine diffusion naturally occurs during the heating process. Accordingly, in this case, no special treatment for fluorine diffusion is required.

There are no special restrictions for selecting a fluorine-containing layer; an inexpensive fluorine-containing silica film can be used. While manufacturing of the fluorine-containing silica film is not subject to restrictions either, a liquid phase film-forming method utilizing separation reaction with silicofluoric acid solution with supersaturated silica is desirable. When using a cloth base material of inorganic fibers, in particular, the aforementioned liquid phase film-forming method using silica-supersaturated silicofluoric acid solution is most preferred in order to completely coat each of the inorganic fibers making up the base material.

In the present invention, establishing an undercoat comprised of a fluorine-containing layer improves the titanium oxide film quality as fluorine contained in the undercoat diffuses within the titanium oxide film. Also, if the base material contains alkaline metallic components, the fluorine-containing layer functions as an alkaline shielding film that prevents the diffusion of alkaline metallic ions, such as Na ions, in glass sheets, in addition to improving the quality of titanium oxide- and other oxide-based photocatalytic films.

There are no restrictions for the types of fluorine-containing layers in the present invention. Because of the need to prevent diffusion of Na and other alkaline metallic ions, however, such oxide thin films as silica, zirconia, and alumina film are most suitably used.

The methods for integrating fluorine into a fluorine-containing layer, fluorine doping methods, vary depending upon the manufacturing methods for the fluorine-containing layer. Silica film manufactured by depositing and growing silicon dioxide (silica) film on the base material surface liquid phase deposition method) by dipping the base material in the aforementioned silicofluoric acid solution containing supersaturated silica is particularly suitable for the purpose of the present invention because it can be manufactured at low temperatures. Also, fluorine is naturally incorporated within the silica film.

Infrared absorption spectrum analysis shows that fluorine is mainly doped in the form of Si—F bonding within the silica film. The amount of fluorine doped within the fluorine-containing layer varies, depending on the types of fluorine-containing layer and manufacturing methods. The appropriate amount for improving photocatalytic activity falls within the range of 0.1–20 percentage by atom; and 2–10 percentage by atom in particular. If the doped amount is less than 0.1 percentage by atom, fluorine diffusion from the fluorine-containing layer (alkaline shielding film) to titanium oxide- and other oxide-based photocatalytic film is insufficient. On the other hand, if it exceeds 20 percentage by atom, the alkaline shielding performance declines. The thickness of the fluorine-containing layer can be determined within a range appropriate to Na ion and the other material's alkaline metallic ion diffusion prevention performance. If the fluorine-containing layer is made of a silica film, 30 nm or thicker is preferred, but from a cost performance perspective, 30–100 nm is particularly suitable.

Other methods for manufacturing a fluorine-containing layer can be used, including the publicly known methods of vacuum deposition, sputtering, chemical vapor deposition, sol-gel, and bonding by spraying particulates.

In the case of manufacturing a fluorine-containing layer by depositing and growing silicon dioxide film on the surface of a base material by dipping the base material in a silicofluoric acid solution containing supersaturated silica (liquid phase deposition method), supersaturation of silica can be achieved by any of the following known methods for the present invention: adding boric acid aqueous solution to silicon dioxide-saturated silicofluoric acid solution (Japanese Examined Patent No. 63-65620/1988), adding aluminum and the like to silicon dioxide-saturated silicofluoric acid solution (Japanese Laid-Open Patent No. 62-20876/1987), adding water to silicon dioxide-saturated silicofluoric acid solution (Japanese Laid-Open Patent No. 3-237012/1991), and utilizing the temperature dependency of silicon dioxide's solubility in silicofluoric acid solution, more specifically by increasing the concentration of silicofluoric acid containing nearly saturated silicon dioxide (Japanese Laid-Open Patent No. 61-281047/1986, Japanese Laid-Open Patent No. 3-112806/1991).

We have discussed cases of establishing in advance a fluorine-containing layer between the photocatalyst layer and the surface of inorganic fiber cloth and glass material. As an alternative to creating the fluorine-containing layer, a fluorine compound, trifluoroacetic acid for example, can be contained in a compound solution for forming metallic oxide for the photocatalyst, which is in contact with the surface of the base material. In other words, when using the sol-gel method, for example, a metallic oxide photocatalytic film containing fluorine can be obtained when coating the aforementioned base material's surface with a solution containing a complex of titanium alkoxide and chelating agent, and trifluoroacetic acid, and then heating in an oxidizing atmosphere.

The functional mechanism of an oxide-based semiconductive photocatalyst, such as titanium oxide, is explained as follows. When light is irradiated against the photocatalyst, photo carriers (pairs of excited electrons and positive holes) are generated as electrons in the valence band of the semiconductor that absorbed the light are excited to a conduction band. Then, the photo carriers diffuse from the inside to the surface of the photocatalyst and react with absorbed oxygen or hydroxyl groups, present in the photocatalyst's surface layer. This reaction generates active oxygen, such as $O^{2-}$ and OH. The active oxygen oxidizes and decomposes organic materials deposited on the photocatalyst surface.

According to the present invention, doping fluorine in the photocatalytic film improves the photocatalyst's reactivity. It is not clear at present why photocatalytic activity improves when fluorine is doped within the photocatalytic film. However, it is suspected that doping fluorine within the photocatalyst film such as titanium oxide turns the colorless film of photocatalyst layer that has high light absorption, such as titanium oxide, into gray and thus reduces light transmittance, thereby increasing light absorption of the photocatalyst layer and the light utilization.

Furthermore, in the case of establishing a fluorine-containing layer and using alkaline metallic composition-containing glass fiber or sheet material (i.e., soda-lime silicate glass composition-containing glass fiber or sheet material) as an inorganic fiber cloth or glass sheet material, the fluorine-containing layer controls the deterioration of titanium oxide film's performance because it prevents the diffusion of Na from the base material, in addition to the aforementioned improved photocatalytic activity. In other words, the performance of a conventional alkaline-containing glass substrate-based photocatalyst is reduced because of the Na ions migrating into titanium oxide film during manufacturing thereby hindering crystallization of the film or Na ions acting as recombination centers for pairs of excited electrons and positive holes, which in turn hinders photo carrier diffusion into the photocatalyst surface and reducing charge separation efficiency. According to the present invention, even when an alkaline-containing glass material is used, the alkaline shielding film (fluorine-containing layer) prevents the material's alkaline metallic ions from entering the titanium oxide film, thereby improving the crystallization of the film. In addition, the absence of alkaline metallic ions, which act as recombination centers for pairs of excited electrons and positive holes, prevents the decline of charge separation efficiency, thereby preventing degradation of photocatalytic activity.

Air filters used in clean rooms and air cleaners are one of the most critical applications of the present invention which is a photocatalyst bearing material obtained by coating an inorganic fiber material with a photocatalyst layer. For air filters, each individual inorganic fiber comprised of nonwoven or woven cloth must be coated with photocatalyst film in order to prevent clogging. Mesh size of the inorganic fiber cloth can be selected in accordance with the use of the cloth. An inorganic fiber cloth (i.e., nonwoven cloth) is preferred that consists of inorganic fibers of an average 0.20–5 µm diameter and having a thickness of 0.1–2 mm and an air-flow resistance expressed with 3–50 mmH$_2$O pressure loss at a 320 cm/min air-flow speed. The material for inorganic fiber can be such fibers as soda-lime silicate glass, alkali-free silicate glass, silica glass, and alumina; materials that allow penetration of light, especially ultraviolet light, are preferred. In addition, it is preferable not to use a resin binder when nonwoven cloth is used. Inorganic fiber materials have larger surface areas, and thus the reactivity of the photocatalyst coating the surface is greater than that of glass sheet materials.

Taking, for example, titanium oxide to form a photocatalyst layer on a base material by using sol-gel method, the inventors discovered that when the base material was coated with a sol-gel material, titanium alkoxide solution with fluorine compound, i.e. trifluoroacetic acid (TFA), and then baked, the fluorine remained within the baked film, thereby increasing the photocatalytic activity. Also, increased electric conductivity due to fluorine doping may contribute to the improved photocatalytic activity.

The aforementioned titanium alkoxide used in the present invention may be compounds generally expressed with the following general formula:

wherein R represents hydrogen atoms and organic groups with 1–5 carbons.

For titanium alkoxide, any of the following may be conveniently used: tetramethoxy titanium, tetraethoxy titanium, tetraisopropoxy titanium, tetraisopropoxy titanium-isopropanol complex, tetra-n-propoxy titanium, tetraisobutoxy titanium, tetra-n-butoxy titanium, tetra-sec-butoxy titanium, and tetra-t-butoxy titanium. In addition, the following may also be used: tetra(2-ethyl hexyloxy) titanium, tetrastearyloxy titanium, di-n-butoxy-bis (triethanolaminate)titanium, titanium isopropoxyoctyleneglycolate, titanium stearate.

Titanium halide alkoxide, such as titanium monochloride trialkoxide and titanium dichloride dialkoxide, in which a part of the alikoxide group (—OR) of the compound expressed by the formula (1) is replaced with a halogen group, may be also used. It is also possible to use alkoxy titanium organic acid chloride, in which at least one of the alkoxide groups of the aforementioned titanium alkoxide is replaced with organic acid, such as acetic acid, propionic acid, butanic acid, acrylic acid, and methacrylic acid.

In addition, by having the surface of the titanium oxide and other photocatalysts bear precious metals, such as platinum, gold, palladium, and silver, the reaction speed of the photocatalyst can be further improved. Impregnation method, settling method, ion-exchange method, photoelectroplating method, kneading method, etc. can be used to integrate precious metals on the outer surface of the photocatalyst film. Among the precious metals, platinum is most suitable. The desirable amount of precious metal to be borne is within the range of 0.01–20 percentage by weight to the titanium oxide film weight; the range of 0.1–2.5 percentage by weight is most desirable.

PREFERRED EMBODIMENTS OF THE INVENTION

Now, the present invention is described more specifically by way of the following examples. The scope of the invention is not intended to be limited, however, to the following examples.

Preparation Examples 1–9 and Comparative Examples 1, 2

[Preparation of Mother Solution]

60.3 g (0.6 moles) acetylacetone (AcAc) was gradually dripped into 85.6 g (0.3 moles) titanium tetraisopropoxide (Ti(OPr)$_4$) by using a buret with stirring. A stable Ti(AcAc)$_2$(OPr)$_2$ complex solution (150 mL) was obtained after stirring for about an hour.

[Preparation of Solutions for Preparation Examples 1–9]

A total of nine types of solutions were produced by adding 0.02 g, 0.03 g, 0.07 g, 0.14 g, 0.21 g, 0.65 g, 1.0 g, 2.06 g and 5.07 g of trifluoroacetic acid (TFA) to a 34.8 mL absolute ethanol.

To each of the solutions, a 15 mL of the aforementioned mother solution is gradually added with stirring to effect a uniform solution (titanium alkoxide concentration of about 0.6 milli-moles/dm$^3$).

[Preparation of Solution for Comparative Example 1]

A 28.39 g titanium tetraisopropoxide was added to a 18.43 g absolute ethanol. After stirring at room temperature for about three minutes, the solution was cooled with ice (Solution A).

Ethanol (18.43 g), water (1.8 g), and hydrochloric acid (0.29 g) were combined (Solution B).

While stirring the aforementioned Solution A, the aforementioned Solution B was gradually dripped in using a buret to produce a uniform solution.

Clear quartz (20×50×1 mm) was used as a substrate. A film was formed on each substrate by way of a dipping method, using the aforementioned nine types of solutions for Preparation Examples 1–9 and one type of solution for Comparative Example 1 (substrate lifting speed=3.8 cm/min.). After ventilation drying for about 30 minutes, they were baked for 30 minutes at 500° C. in air. The samples were coded as a, b, c, d, e, f, g, h, and i in order of the concentration of TFA in the solutions for Preparation Examples, and j for the solution in Comparative Example 1. They are shown in Table 1.

TABLE 1

|  | Ti(OR)$_4$ + AcAc(ml) | EtOH(ml) | TFA(g)* | Sample No. |
|---|---|---|---|---|
| Preparation Example 1 | 15 | 34.8 | 0.02 | a |
| Preparation Example 2 | 15 | 34.8 | 0.03 | b |
| Preparation Example 3 | 15 | 34.8 | 0.07 | c |
| Preparation Example 4 | 15 | 34.8 | 0.14 | d |
| Preparation Example 5 | 15 | 34.8 | 0.21 | e |
| Preparation Example 6 | 15 | 34.8 | 0.65 | f |
| Preparation Example 7 | 15 | 34.8 | 1.00 | g |
| Preparation Example 8 | 15 | 34.8 | 2.06 | h |
| Preparation Example 9 | 15 | 34.8 | 5.07 | i |
| Comparative Example 1 | (Ti(OR)$_4$ + EtOH + HCl) | | — | j |

The results of film thickness analyses using a scanning electron microscope (measurement accuracy=approximately 10%) show that each sample's film thickness was approximately 70 nm. Measurement by X-ray diffraction showed that all films had an anatase-type titanium oxide structure.

In addition, using sample d, the film's depth-wise concentrations of elements (percentage by atom) were determined by using Rutherford backscattering spectrometry. The results are shown in FIG. 1 (sample d) and Table 2.

Fluorine content was zero at the surface. It gradually increased in the deeper areas and reached the maximum at approximately 30 nm depth, which was approximately 1.6 percentage by atom.

In FIG. 1, silicon (Si) derived from quartz substrate and carbon (C) were thought to be residuals of carbon in titanium alkoxide.

TABLE 2

| | Element Content (Percentage by Atom) | |
|---|---|---|
| | At Surface | At 40 nm Deep |
| Oxygen | 68 | 51 |
| Titanium | 29 | 28 |
| Carbon | 3 | 19 |
| Silicon | 0 | 0 |
| Fluorine | 0 | 2 |

The catalytic activity of the photocatalyst samples obtained was determined by the following method to measure the speed of photodecomposition of 1, 3, 5, 7-tetramethylcyclotetrasiloxane (TMCTS), which was applied to coat the samples, and which was exposed by light (Tada, Langmuir, Vol. 12, No. 4, pp.966–971, 1996). The aforementioned ten types of samples were UV/O$_3$ cleansed (50° C. for 10 minutes) and set in a vacuum desiccator. The pressure was reduced to approximately 10 Torr with a vacuum pump and the internal temperature was maintained at 80° C. After closing the system, 200 L 1,3,5,7-tetramethylcyclotetrasiloxane (TMCTS) was injected using a syringe, and it was heated for 30 minutes. Furthermore, TMCTS that had not reacted was cold trapped by raising the temperature to 100° C. while reducing pressure and heating for 30 minutes. This formed a TMCTS monomolecular film on each of the photocatalyst film samples. The aforementioned samples' surfaces, which were hydrophilic, turned water repellent due to the formation of the TMCTS monomolecular film. Using a 2 kW high-voltage mercury lamp as a light source, light was irradiated perpendicularly to the film surface of each sample's titanium oxide film from 20 cm away. The TMCTS monomolecular film was oxidized and decomposed and the hydrophilicity of the surfaces gradually increased. The faster the oxidation and decomposition speed of the TMCTS monomolecular, the greater the photocatalytic activity of the samples. The results are summarized in Table 3.

TABLE 3

| | Sample | TFA/Ti Mol Ratio | Decomposition Speed Constant (/min.) |
|---|---|---|---|
| Preparation Example 1 | a | 0.006 | 0.0275 |
| Preparation Example 2 | b | 0.009 | 0.0367 |
| Preparation Example 3 | c | 0.02 | 0.0582 |
| Preparation Example 4 | d | 0.04 | 0.0743 |
| Preparation Example 5 | e | 0.06 | 0.0518 |
| Preparation Example 6 | f | 0.19 | 0.0368 |
| Preparation Example 7 | g | 0.29 | 0.0325 |
| Preparation Example 8 | h | 0.60 | 0.0266 |
| Preparation Example 9 | i | 1.48 | 0.0259 |
| Comparative Example 1 | j | — | 0.0083 |

The decomposition speed constants of Preparation Examples 1–9 which use TFA were about double or greater than that of Comparative Example 1, which did not use TFA, and thus indicate significantly high levels of photocatalytic activity. Among the Preparation Examples 1–9, the decomposition speed constant rapidly increased in proportion with TFA content up to the peak at TFA/Ti mole ratio (=R) of 0.04 (Preparation Example 4) and then declined thereafter. In addition, the electronic absorption spectrum confirmed an increased absorption in visible areas due to the TFA addition.

Table 4 shows the photocatalytic activity evaluation results of sample d (Preparation Example 4), sample j (Comparative Example 1), and quartz substrate (without $TiO_2$ coat, Comparative Example 2), when light with a 420 nm or longer wavelength was irradiated by using an Xe lamp as a visible light source. Almost no TMCTS decomposition occurred in the sample in Comparative Example 1. On the contrary, decomposition occurred in Preparation Example 4 (sample d).

TABLE 4

|  | Sample | TFA/Ti Mol Ratio | Decomposition Speed Constant (/min.) |
| --- | --- | --- | --- |
| Preparation Example 4 | d | 0.04 | 0.013 |
| Comparative Example 1 | j | 0 | 0.0003 |
| Comparative Example 2 | (no catalyst) | — | 0.0003 |

From the above results, it is evident that the titanium oxide-based photocatalyst film, according to the present invention, is also functioning as a photocatalyst using visible light.

The following Preparation Examples 10–14 illustrate the formats having glass fibers as a photocatalyst bearing material.

Preparation Example 10
[Preparation of Glass Fiber-Based Nonwoven Cloth Coated With Fluorine-Containing Silica Film (Nonwoven Cloth A)]

The following steps were followed to coat a glass fiber-based nonwoven cloth with fluorine-containing silica film. The glass fiber-based nonwoven cloth material (size: 10 cm×10 cm) is composed of soda-lime silicate glass (containing approximately 13 percentage by weight of alkaline metallic oxide) fibers (average diameter of 0.5 m) and made without resin binder by means of conventional wet deposition method to have about a 0.5 mm thickness unit-area weight of 200 g/m$^2$, and pressure loss of about 20 mmH$_2$O at a wind velocity of 320 cm/min.

A silica gel-saturated 50 mL silicofluoric acid (3.9 moles/L) solution is heat insulated at 35° C. To this, 50 mL of 35° C. water is added to produce an aqueous solution of silicofluoric acid containing supersaturated silicon dioxide (1.95 moles/L). Into this aqueous solution, maintained at 35° C., the aforementioned glass fiber-based nonwoven material was dipped for about two hours and pulled out to obtain fluorine-containing silica film-coated glass fiber-based nonwoven cloth.

Electron microscope photography confirmed that each glass fiber making up this nonwoven cloth (Nonwoven Cloth A) is uniformly coated by silica film. The average thickness of the silica film was approximately 40 nm. It was confirmed that the silica film contained 0.5 percentage by weight fluorine.
[Preparation of (Fluorine-Containing Silica Film+Fluorine-Containing Titanium Oxide Film)–Coated Glass Fiber-Based Nonwoven Cloth (Sample A)]

The following describes the coating method for fluorine doped titanium oxide film using the sol-gel method. 60.3 g (0.6 moles) of acetylacetone (AcAc) was gradually dripped using a buret into 85.6 g (0.3 moles) of titanium tetraisopropoxide (Ti(OPr)$_4$) with stirring. Stirring for about one hour produced a stable Ti(AcAc)$_2$(OPr)$_2$ complex solution (mother solution). Meanwhile, another solution was produced by dissolving 0.14 g of trifluoro acetic acid (TFA) in 34.8 mL ethanol. The mother solution (15 mL) was added to the solution and stirred sufficiently to obtain a uniform fluorine-doped titanium oxide coating solution. The aforementioned fluorine-containing silica film-coated Nonwoven Cloth A was dipped in the coating solution and pulled out at a speed of 4.6 cm/min and then the Nonwoven Cloth A was coated. Photocatalyst-bearing glass fiber-based nonwoven cloth (Sample A) was obtained by drying for 30 min. at room temperature and baking for 30 minutes at 500° C. thereafter.

Plasma emission spectral analysis showed that the amount of titanium oxide bearing each nonwoven cloth was 24.4 percentage by weight of the nonwoven cloth before coating. If converted, titanium oxide film with a thickness of about 650 nm covered the fiber surfaces of each nonwoven cloth. Measurement by X-ray diffraction confirmed that the titanium oxide film obtained was anatase-type titanium oxide.

In addition, a total of about 0.1 percentage by weight of fluorine, which migrated from the fluorine-containing silica film and derived from trifluoroacetic acid in the titanium oxide coating solution, was contained within Sample A's titanium oxide film. Sample A's pressure loss was about 25 mmH$_2$O at a wind velocity of 320 cm/min; and the increase of the pressure loss was slight compared to untreated nonwoven cloth (about 20 mmH$_2$O).

Comparative Example 3
[Preparation of Glass Fiber-Based Nonwoven Cloth Coated With Fluorine-Free Silica Film (Nonwoven Cloth B)]

Tetraethoxysilane (30 parts by weight), 2-propanol (200 parts by weight), ethanol (200 parts by weight), IN nitric acid (2.5 parts by weight) and water (30 parts by weight) are stirred for two hours at 60° C. The solution is further stirred and cured for a day at 30° C. to obtain an alkali-shielding sol solution.

The glass fiber-based nonwoven material used in Preparation Example 10 was dipped in the aforementioned sol solution and pulled out at a speed of 30 cm/min and then the Nonwoven Cloth B was coated. It was dried at room temperature for a few minutes and then heated for three hours at 500° C. to obtain Nonwoven Cloth B, in which the surfaces of glass fibers (average diameter of 0.5 $\mu$m) were coated with silica film of about 80 nm thickness.
[Preparation of (Fluorine-Free Silica Film+Fluorine-Free Titanium Oxide Film)–Coated Glass Fiber-Based Nonwoven Cloth (Sample B)]

Tetraisopropoxy titanium (170.7 g) was added to 2-ethoxyethanol (118.6 g) and stirred for three hours at 60° C. to obtain a titanium oxide coating solution. The aforementioned silica film-coated Nonwoven Cloth B was dipped in the titanium oxide coating solution and pulled out at a speed of 4.6 cm/min. It was dried at room temperature for about 30 minutes, and then baked at 500° C. for 30 minutes to obtain the photocatalyst-bearing glass fiber-based nonwoven cloth (Sample B). Plasma emission spectral analysis showed that the amount of the titanium oxide bearing each nonwoven cloth was 24.4 percentage by weight of the nonwoven cloth before coating. If converted, titanium oxide film with a thickness of about 650 nm covered the fiber surfaces of each nonwoven cloth. Measurement by X-ray diffraction confirmed that the titanium oxide film obtained was anatase-type titanium oxide.

Preparation Example 11
[Preparation of (Fluorine-Containing Silica Film+Fluorine-Free Titanium Oxide Film)–Coated Glass Fiber-Based Nonwoven Cloth (Sample C)]

Photocatalyst-bearing glass fiber-based nonwoven cloth (Sample C) was produced by using the same method as in Preparation Example 10 (using fluorine-containing silica film-coated glass fiber-based nonwoven cloth (Nonwoven Cloth A)), except the titanium oxide coating solution used in Comparative Example 3 was used instead of the fluorine-doped titanium oxide coating solution as in Preparation Example 10.

Preparation Example 12
[Preparation of (Fluorine-Free Silica Film+Fluorine-Containing Titanium Oxide Film)–Coated Glass Fiber-Based Nonwoven Cloth (Sample D)]

Photocatalyst-bearing glass fiber-based nonwoven cloth (Sample D) was produced by using the same method as in Preparation Example 10 (using fluorine-containing silica film-coated glass fiber-based nonwoven cloth (Nonwoven Cloth A)), except an alkaline shielding sol solution for silica film coating was used as in Comparative Example 3 instead of the fluorine-containing silica film coating by dipping in silicofluoric acid as in Preparation Example 10.

Preparation Example 13
[Preparation of (Entreated Silica Film+Fluorine-Containing Titanium Oxide Film)–Coated Glass Fiber-Based Nonwoven Cloth (Sample E)]

The fiber cloth material is a silica fiber nonwoven cloth (size 10 cm×10 cm), which is made of silica fiber (average diameter of 1.0 $\mu$m) without binder and is about 0.5 mm thickness and unit-area weight of 200 g/m$^2$.

Other than using the above silica fiber nonwoven cloth (untreated) in place of the fluorine-containing silica film-coated glass fiber-based nonwoven cloth made by dipping in a silicofluoric acid as in Preparation Example 10, the same method as in Preparation Example 10 (silica fiber nonwoven cloth (untreated) is coated with fluorine-doped titanium oxide film) was used to produce photocatalyst-bearing silica fiber-based nonwoven cloth (Sample E).

The photocatalytic activity of the samples A–E (photocatalyst-bearing fiber based nonwoven cloth) obtained in the above Preparation Examples 10–13 and Comparative Example 3 was evaluated by irradiating light against Samples A–E in an enclosed space filled with acetaldehyde-containing air and determining the changes in the acetaldehyde concentration by using gas chromatography.

Samples A–E (photocatalyst-bearing fiber based nonwoven cloth) were arranged in an enclosed container filled with about 5000 cc acetaldehyde-containing air (initial acetaldehyde concentration of about 240 ppm), and a 250 W high-voltage mercury lamp was placed so as to perpendicularly irradiate the surfaces of nonwoven cloth Samples A–E with ultraviolet light from 20 cm away.

Changes in acetaldehyde concentration within Samples A–E were measured over irradiation time. The greater the photocatalytic activity of nonwoven cloth Sample A–E, the faster the oxidation and decomposition of acetaldehyde and, thus, a reduction of acetaldehyde concentration occurred.

An irradiation time of about 120 nm (half-life) was measured for the initial acetaldehyde concentration of 240 ppm to be reduced to a half. The shorter the half-life, the faster the acetaldehyde decomposition speed by the photocatalyst, demonstrating higher photocatalytic activity. The results of irradiation half-life of each samples are shown in Table 5.

TABLE 5

|  | Sample No. | Half-Life (Minutes) |
| --- | --- | --- |
| Preparation Example 10 | A | 60 |
| Comparative Example 3 | B | 330 |
| Preparation Example 11 | C | 100 |
| Preparation Example 12 | D | 80 |
| Preparation Example 13 | E | 80 |

In any of the nonwoven cloth Samples A–E simple reduction in acetaldehyde concentration was observed by the irradiation time. The time required for halving the initial acetaldehyde concentration (decay time) for Sample B was about 330 minutes, while it was 60 minutes for Sample A; Preparation Examples 10–13 (Samples A, C–E) have greater acetaldehyde decomposition rates than Comparative Example 3 (Sample B).

When acetaldehyde-containing air was circulated after passing through the photocatalyst-bearing glass fiber-based nonwoven cloth by using a fan during irradiation, Sample A demonstrated an even faster acetaldehyde decomposition rate of 20 minutes half-life.

As explained above, it is evident that the photocatalyst bearing material based on inorganic base materials, according to the present invention, has an excellent capability for decomposing rarefied harmful inorganic gases, and is suitably used as interior wall materials and in air filters for super clean enclosed spaces for semiconductor production and conveyer enclosed spaces, clean rooms for various purposes, and office and residential buildings.

The following illustrates preparation examples and comparative examples of producing photocatalyst bearing materials after forming alkaline shielding layers on glass sheet materials.

Preparation Example 14
[Soda-Lime Glass Substrate+Fluorine-Free Silica Film+Fluorine-Containing Titanium Oxide Film]

While stirring 85.6 g (0.3 moles) of titanium tetraisopropoxide (Ti(OPr)$_4$), 60.3 g (0.6 moles) acetylacetone (AcAc) was gradually dripped using a buret. It was stirred for an hour to effect a stable Ti(AcAC)$_2$(OPr)$_2$ complex solution (mother solution). Meanwhile, another solution was produced by dissolving 0.14 g of trifluoroacetic acid (TFA) into ethanol (34.8 mL). To this solution, the mother solution was added. This was stirred sufficiently to obtain a uniform fluorine-doped titanium oxide coating solution.

SiO$_2$ film-coated soda-lime glass substrate (Substrate F) was produced according to the sol-gel method as follows: a soda-lime glass substrate was spin-coated for 10 seconds at a speed of 1000 rpm with a solution, which was obtained by adding 6 g of 0.1N hydrochloric acid and 44 g of ethyl cellusolve to 50 g of ethyl silicate ("Ethyl Silicate 40" available from Colcoat Co., Ltd.), and that was stirred for two hours at room temperature, and baked for 120 seconds at 720° C. to produce a glass substrate that is silicone dioxide-coated on one side. The process was repeated to coat the other side of the substrate; each side has a silicon dioxide film of 100 nm thickness.

The above Substrate F was dipped in the aforementioned uniform fluorine-doped titanium oxide coating solution and pulled out at a speed of 3.2 cm/min to form a film on the surface. After letting it stand for about 30 minutes, it was baked for 30 minutes at 500° C. to form a titanium oxide film on the surface of Substrate F. The photocatalyst sample obtained with Substrate F is referred to as Sample F.

The results of titanium oxide film thickness analysis with a scanning electron microscope (measurement accuracy= approximately 10%) show that film thickness of Sample F was approximately 100 nm. Measurement by X-ray diffraction showed that all films had an anatase-type titanium oxide (TiO$_2$) crystal structure.

In addition, the film's depth-wise concentrations of elements percentage by atom) were determined by using Rutherford backscattering spectrometry. The results are shown in Table 6.

TABLE 6

| | Element Content (Percentage by Atom) | |
|---|---|---|
| | At Surface | At 40 nm Deep |
| Oxygen | 68 | 51 |
| Titanium | 29 | 28 |
| Carbon | 3 | 19 |
| Silicon | 0 | 0 |
| Fluorine | 0 | 2 |

Catalytic activity of Sample F obtained in Preparation Example 14 is shown in Table 7.

Preparation Example 15
[Soda-Lime Glass Substrate+Fluorine-Containing Silica Film+Fluorine-Free Titanium Oxide Film]

A uniform titanium compound coating solution was obtained by diluting the mother solution (Ti(AcAc)$_2$(OPr)$_2$ complex solution) obtained in Preparation Example 14 with ethanol to 3.3 times and stirring thoroughly.

The fluorine-containing SiO$_2$ film-coated soda-lime glass substrate (Substrate G) was produced as follows. A silicon dioxide-saturated hydrofluoric acid (3.9 moles/L) aqueous solution was heat insulated at 35° C. To this, 50 mL of 35° C. water was added to produce an aqueous solution of silicofluoric acid containing supersaturated silicon dioxide (1.95 moles/L). Into this aqueous solution, maintained at 35° C., the soda-lime glass substrate (appended Substrate H: sized 20×50×1.0 mm) was dipped for about two hours and pulled out to obtain a fluorine-containing silicone dioxide film (film thickness 60 nm, fluorine content of about 5 percentage by atom)-coated glass substrate (Substrate G).

The above Substrate G was dipped in the aforementioned titanium compound coating solution and taken out at a speed of 3.2 cm/min. to form a film on the substrate surface. After letting it stand for 30 minutes, it was baked for 30 minutes at 500° C. to form a titanium oxide film-based photocatalyst on surface of substrate G. The photocatalyst sample obtained by Substrate G is referred to as Sample G.

Comparative Example 4
[Soda-Lime Glass Substrate+Fluorine-Free Titanium Oxide Film]

For Substrate H, an untreated soda-lime glass substrate (components: SiO$_2$/72.6%, Al$_2$O$_3$/1.8%, Na$_2$O/13.5%, CaO/8.9%, MgO/3.9%, Fe$_2$O$_3$/0.1%, sized 20×50×1.0 mm) was prepared and dipped in the titanium compound coating solution obtained in the above Preparation Example 15 and pulled out at a speed of 3.2 cm/min. to form a film on the surface. After letting it stand for 30 minutes, it was baked for 30 minutes at 500° C. to obtain a titanium oxide film based photocatalyst on the surface. The photocatalyst sample obtained by Substrate H is referred to as Sample H.

Comparative Example 5
[Soda-Lime Glass Substrate+Silica Film+Fluorine-Free Titanium Oxide Film]

For Substrate I, a soda-lime glass substrate (20×50×1.0 mm), which was obtained from Substrate H coated with SiO$_2$ film (100 nm thickness) by the sol-gel method, was produced. In other words, a soda-lime glass substrate was spin-coated for 10 seconds at a speed of 1000 rpm with a solution that was obtained by adding 6 g of 0.1N hydrochloric acid and 44 g of ethyl cellusolve to 50 g of ethyl silicate ("Ethyl Silicate 40" available from Colcoat Co., Ltd.) and stirring for two hours at room temperature, and then baking for 120 seconds at 720° C. to produce a glass substrate that is silicone dioxide-coated on one side. The process was repeated to coat the other side of the substrate; each side has a silicon dioxide film of 100 nm thickness.

Substrate I was then dipped in the titanium compound coating solution obtained in the above Preparation Example 15 and taken out at a speed of 3.2 cm/min. to form a film on the substrate surface. After letting it stand for 30 minutes, it was, baked for 30 minutes at 500° C. to form a titanium oxide film based photocatalyst on its surface. The photocatalyst sample obtained from Substrate I is referred to as Sample I.

The results of film thickness analyses with a scanning electron microscope (measurement accuracy=approximately 10%) show that each of the samples G–I and Sample F obtained from Preparation Example 14 had a film thickness of approximately 100 nm. Measurement by X-ray diffraction showed that all films had an anatase-type titanium oxide TiO$_2$) crystal structure.

The catalytic activity of the photocatalyst samples F from Preparation Example 14, G–I obtained from Preparation Example 15 and Comparative Examples 4–5 was determined by the same method used for Preparation Examples 1–9. The method was that the surface of samples F–I were coated by TMCTS, irradiated, and the speed of photodecomposition of TMCTS applied to coat the samples measured (Tada, Langmuir, Vol. 12, No. 4, pp. 966–971, 1996). The results are summarized in Table 7.

TABLE 7

| | Sample | TMCTS Decomposition Speed (min$^{-1}$) | Crystal Type | TiO$_2$ Film Thickness (nm) | SiO$_2$ Film Thickness (nm) |
|---|---|---|---|---|---|
| Preparation Example 14 | F | 0.075 | anatase | 100 | 100 |
| Preparation Example 15 | G | 0.028 | anatase | 100 | 60 |
| Comparative Example 4 | H | 0.0033 | anatase | 100 | — |
| Comparative Example 5 | I | 0.0048 | anatase | 100 | 100 |

Photocatalytic activity, in descending order, is Samples F, G, I, and H. The use of fluorine-containing alkaline shielding undercoat resulted in excellent photocatalytic activity even when soda-lime glass substrate was used.

As explained above, photocatalysts comprised of titanium oxide film/fluorine-containing alkaline shielding film/glass substrate, according to the present invention, demonstrate excellent reactivity. In addition, because of excellent light transmittance, the photocatalysts are suitable for use in window glass of hospitals, offices, and automobiles for the purposes of cleaning air, and performing antibacterial, antifouling, and defogging functions.

Industrial Applications

Photocatalysts produced in accordance with the present invention can be used for homes, offices, hospitals, and clean rooms, for various industries, such as semiconductor, liquid crystal, chemical, chemical, food, agricultural and forestry, pharmaceutical, and precision machinery manufacturing. Furthermore, the aforementioned photocatalysts can be used for enclosed spaces in sterile rooms (i.e., safety cabinet, clean box, safe for valuables), and enclosed conveyance spaces for valuables of various industries, for the purposes of cleaning clean enclosed spaces (with various gases or in vacuum), cleaning the air, acting as an antibacterial agent, and defogging clear sheets (maintain hydrophilic property), etc.

In addition, it is evident that inorganic fiber-based photocatalyst bearing materials constituting the present invention have an excellent ability to decompose rarefied harmful organic gases, and thus are suitable for use as interior wall materials and air filters for super clean room spaces for semiconductor production and enclosed conveyance spaces, clean rooms of various purposes, and office and residential buildings.

What is claimed is:

1. A photocatalyst consisting essentially of a fluorine-doped metallic oxide semiconductor, wherein said photo catalyst is in the form of a film, flake, powder or fiber.

2. The photocatalyst according to claim 1 having a thickness or a minimum size of 20–500 nm.

3. The photocatalyst according to claim 1 wherein said metallic oxide is a titanium oxide.

* * * * *